United States Patent
Yoon et al.

(10) Patent No.: US 9,982,778 B2
(45) Date of Patent: May 29, 2018

(54) DIAGNOSTIC METHOD FOR SHIFTING ACTUATOR OF TRANSMISSION

(71) Applicants: Hyundai Motor Company, Seoul (KR); Kia Motors Corp., Seoul (KR)

(72) Inventors: Young Min Yoon, Suwon-si (KR); Seung Sam Baek, Jeju-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 337 days.

(21) Appl. No.: 14/717,121

(22) Filed: May 20, 2015

(65) Prior Publication Data
US 2016/0153552 A1 Jun. 2, 2016

(30) Foreign Application Priority Data

Nov. 27, 2014 (KR) .................. 10-2014-0167023

(51) Int. Cl.
*F16H 61/12* (2010.01)
*F16H 61/32* (2006.01)

(52) U.S. Cl.
CPC ............. *F16H 61/12* (2013.01); *F16H 61/32* (2013.01); *F16H 2061/1208* (2013.01)

(58) Field of Classification Search
None
See application file for complete search history.

(56) References Cited

U.S. PATENT DOCUMENTS

| 2005/0073398 A1* | 4/2005 | Sayman ............... F16H 61/12 340/441 |
| 2008/0064568 A1* | 3/2008 | Kawaguchi ............ F16H 61/12 477/125 |
| 2011/0303040 A1* | 12/2011 | Hagelskamp ....... F16H 61/0206 74/473.11 |

FOREIGN PATENT DOCUMENTS

| JP | 10-108353 A | 4/1998 |
| JP | 2006-200603 A | 8/2006 |
| JP | 4324766 B2 | 9/2009 |
| KR | 10-2004-0111469 A | 12/2004 |
| KR | 10-2012-0038797 A | 4/2012 |

* cited by examiner

*Primary Examiner* — Edwin A Young
(74) *Attorney, Agent, or Firm* — Morgan, Lewis & Bockius LLP

(57) ABSTRACT

A diagnostic method for shifting an actuator of a transmission may include accumulating, by a controller, a damage index for an applied current when a current is applied to the actuator of the transmission, and determining, by the controller, whether the accumulated damage index exceeds a predetermined reference index and when it is determined that the accumulated damage index exceeds the predetermined reference index, determining the actuator as a failure.

4 Claims, 4 Drawing Sheets

| DIVISION | APPLIED CURRENT | | | | |
|---|---|---|---|---|---|
| | LESS THAN 10A | 10A TO LESS THAN 20A | 20A TO LESS THAN 30A | 30A TO LESS THAN 40A | 40A OR MORE |
| CONTINUOUS CURRENT APPLICATION ALLOWABLE TIME [msec] | ∞ | 10000 | 5000 | 2000 | 1000 |
| DAMAGE INDEX [%/msec] | -0.01 | +0.01 | +0.02 | +0.05 | +0.1 |

DIAGNOSTIC METHOD FOR SHIFTING ACTUATOR OF TRANSMISSION

CROSS-REFERENCE(S) TO RELATED APPLICATIONS

The present application claims priority to Korean Patent Application Number 10-2014-0167023 filed Nov. 27, 2014, the entire contents of which is incorporated herein for all purposes by this reference.

BACKGROUND OF THE INVENTION

Field of the Invention

Various embodiments of the present invention relate to a diagnostic method for shifting an actuator of a transmission, and more particularly, to a technology of diagnosing failures such as jam, stuck, and the like of an actuator of a transmission capable of engaging and disengaging a change gear by performing a selecting or shifting operation in an automated manual transmission AMT, a dual clutch transmission DCT, or the like.

Description of Related Art

Recently, an automated manual transmission (AMT) and a dual clutch transmission (DCT) capable of simultaneously achieving driving convenience of an automatic transmission and fuel efficiency performance and high power efficiency of a manual transmission have been actively developed.

The automated manual transmission is a system which operates a clutch based on a manual transmission and automatically shifts a gear, in which the operation is performed using an actuator which is driven by an oil pressure or a motor.

As the actuator, there are a clutch actuator to control the clutch and an actuator of a transmission to shift the gear by performing the selecting operation and the shifting operation.

Among the actuators, the actuator of the transmission using the motor performs a control only at the time of the engagement and disengagement of the gear, and therefore, the motor which may continuously apply a current is designed to have a relatively smaller capacity than the clutch actuator, such that the actuator of the transmission may be cheaper.

Therefore, when a high load is applied to the motor of the actuator of the transmission, a high current is applied to the motor and thus the motor may be damaged. In particular, a stuck, an increase in drag (jam), and the like of the actuator of the transmission are representative symptoms which increase the load of the motor. When the symptoms are determined in an early stage so as not to perform a failure diagnosis, performance of the transmission may deteriorate, durability of the motor may be reduced, and the motor may be damaged.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a diagnostic method for shifting an actuator of a transmission capable of preventing a durability of the actuator of the transmission from reducing or the actuator of the transmission from being damaged and performance of the transmission from deteriorating, by appropriately diagnosing and determining whether excessive loads such as stuck or jam are applied to the actuator of the transmission.

According to various aspects of the present invention, a diagnostic method for shifting an actuator of a transmission may include accumulating, by a controller, a damage index for an applied current when a current is applied to the actuator of the transmission, and determining, by the controller, whether the accumulated damage index exceeds a predetermined reference index and when it is determined that the accumulated damage index exceeds the predetermined reference index, determining the actuator as having a failure.

Damage indexes may be separately set for each magnitude in the applied current and the controller may determine the damage indexes corresponding to a magnitude of currently applied current and accumulate the determined damage indexes for each operation cycle of the controller.

The damage indexes may be defined as a value for a predetermined unit time depending on a continuous application allowable time for each corresponding current which is a time at which a motor for the actuator of the transmission endures operating without damage when a current is continuously applied.

The damage indexes may be accumulated for the continuous application allowable time for each corresponding current, the damage indexes may each be set to be 100, and in the determining of the failure, when the predetermined reference index is set to be 100 and thus the accumulated damage index is 100 which is the reference index, the actuator may be determined as having the failure.

According to various aspects of the present invention, a controller for an actuator of a transmission may include a storage device storing damage indexes which are separately set for each magnitude of an applied current to the actuator of the transmission, an operation device acquiring and accumulating the damage indexes from the storage device depending on a magnitude of the current applied to the actuator of the transmission, and a determination device determining the actuator of the transmission as having a failure when the accumulated damage index exceeds a predetermined reference index.

The actuator comprises may include a select actuator performing a selecting operation and a shift actuator performing a shifting operation.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
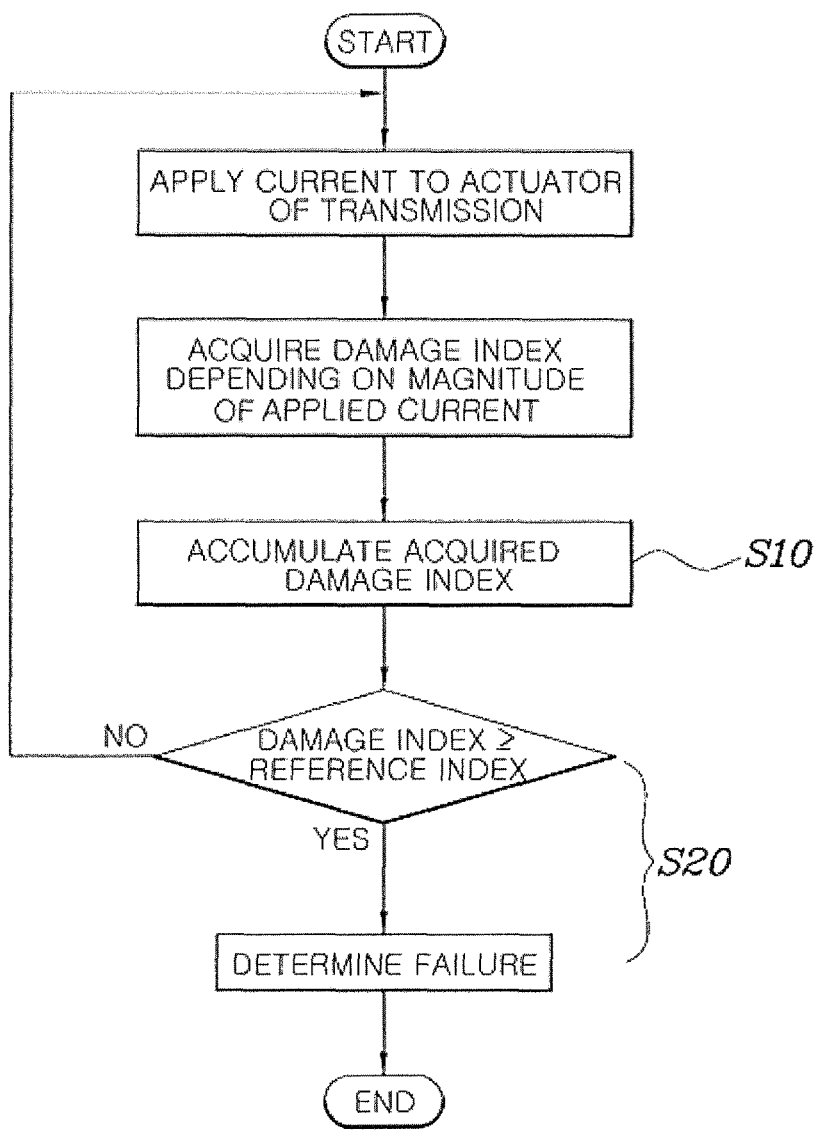
FIG. 1 is a flow chart describing an exemplary diagnostic method for shifting an actuator of a transmission according to an exemplary embodiment of the present invention.

Referring to FIG. 1, a diagnostic method for shifting an actuator of a transmission according to various embodiments of the present invention is accumulating, by a controller, a damage index for an applied current when a current is applied to the actuator of the transmission (S10), and determining whether the accumulated damage index exceeds a predetermined reference index and if it is determined that the accumulated damage index is equal to or exceeds the predetermined reference index, determining the actuator as a failure (S20).

The damage indexes are separately set for each magnitude in the applied current and thus the controller finds out the damage indexes corresponding to the magnitude in the currently applied current and accumulates the found damage indexes for each operation cycle of the controller.

That is, according to various embodiments of the present invention, when a current is applied to the actuator of the transmission, if the damage indexes preset depending on the magnitude in the applied current are accumulated and the accumulated value is increased or decreased and then reaches a state exceeding the reference index, it is determined that phenomena such as jam and stuck occur in the actuator of the transmission and when it is determined to be a failure, measures such as cutting off the applied current and turning on a warning light to cope with the failure are performed, thereby preventing durability of a motor equipped in the actuator of the transmission from reducing, preventing the motor from being damaged, and preventing performance of the transmission from deteriorating.

Figures 2, 3:
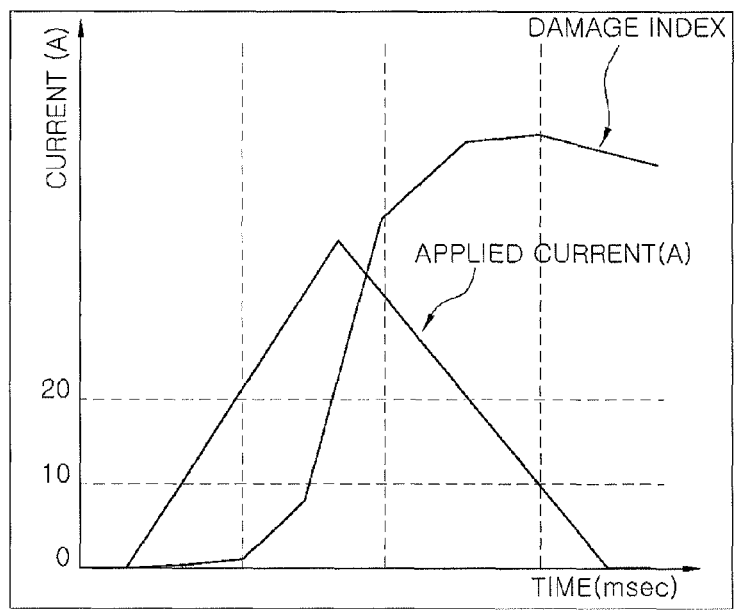
FIG. 2 is a table illustrating an example of damage indexes for each applied current according to an exemplary embodiment of the present invention.
FIG. 3 is a graph for describing an aspect in which accumulated values of the damage indexes depending on a change in current applied to the actuator of the transmission according to an exemplary embodiment of the present invention are changed.

As illustrated in FIG. 2, the damage indexes may be preferably defined as a value for a predetermined unit time depending on a continuous application allowable time for each corresponding current which is a time at which the motor for the actuator of the transmission may be endured when a current is continuously applied.

That is, as illustrated in FIG. 2, when a current less than 10 A is applied, the motor is not damaged no matter how long a time a current is applied to the motor and when a current which is equal to or more than 40 A is applied to the motor, if the motor may endure only 1000 msec, the infinite and the 1000 msec which are a time at which the motor may endure without damage within the corresponding current range each are the continuous application allowable time for the corresponding current. In this case, the unit time is set to be 1 msec in various embodiments.

In connection with this, according to various embodiments of the present invention, when the damage indexes are accumulated for the continuous application allowable time for each corresponding current, the damage indexes each set to be 100 and in the determining of the failure (S20), when the predetermined reference index is set to be 100 and thus the accumulated damage index is 100 which is the reference index, the actuator is determined as the failure.

That is, when a current which is equal to or more than 40 A is applied for 1000 msec, 0.1 which is a value which is 100 by accumulating the damage index for 1000 msec is determined as the damage index, such that for the applied current of 40 A, the damage index is set to be 0.1%/msec. When a current of 40 A is continuously applied to the actuator of the transmission for 1000 msec, the accumulated damage index is 100. In this case, when the reference index is 100 which is a reference of the determination of the failure, the actuator of the transmission may be immediately determined as a failure.

FIG. 3 is a graph for describing an aspect in which accumulated values of the damage indexes depending on a change in current applied to the actuator of the transmission according to various embodiments of the present invention are changed, in which the graph shows that as the applied current is increased, the damage index is increased but since the applied current is reduced, when a current of less than 10 A which indicates that the damage does not occur even though a current is applied for an infinite time in FIG. 2 is applied, the damage index is gradually reduced. Therefore, it may be appreciated from the graph that the damage index is increased and decreased in consideration of a size and a duration of a current applied to the actuator of the transmission.

That is, the degree to which the damage of the actuator of the transmission is concerned depending on the size and duration of the current applied to the actuator of the transmission is represented by the damage index, thereby providing the substantial and effective determination basis for the protection of the actuator of the transmission.

Further, the continuous application allowable time and the damage index for each current are appropriately selected by multiple experiments and analyses, and thus it is preferable to substantially reflect a physical burden applied to the actuator of the transmission.

Figure 4:
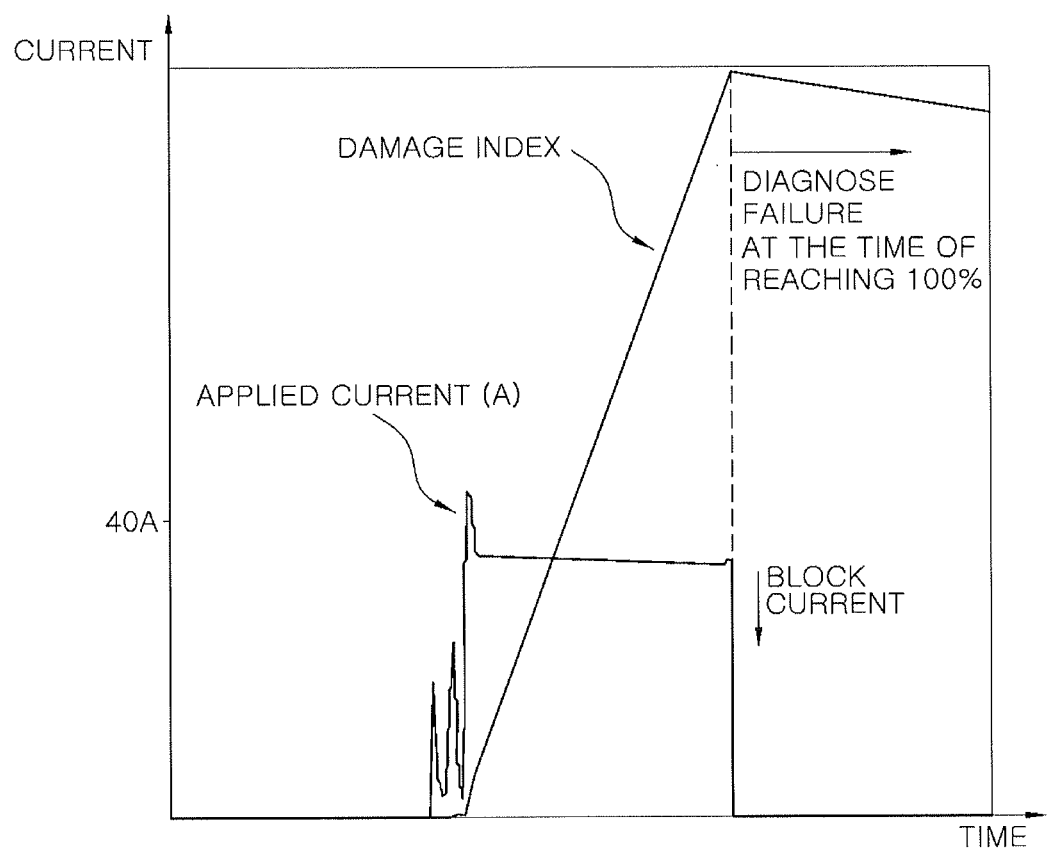
FIG. 4 is a graph describing an action when an excessive current is almost constantly applied to the actuator of the transmission according to the exemplary embodiment of the present invention.

For reference, when the excessive current of about 40 A is continuously applied to the actuator of the transmission based on the data of FIG. 2, FIG. 4 illustrates that when the damage index is increased and thus reaches 100%, the actuator of the transmission is determined as the failure, and thus the current is cut off.

Figure 5:
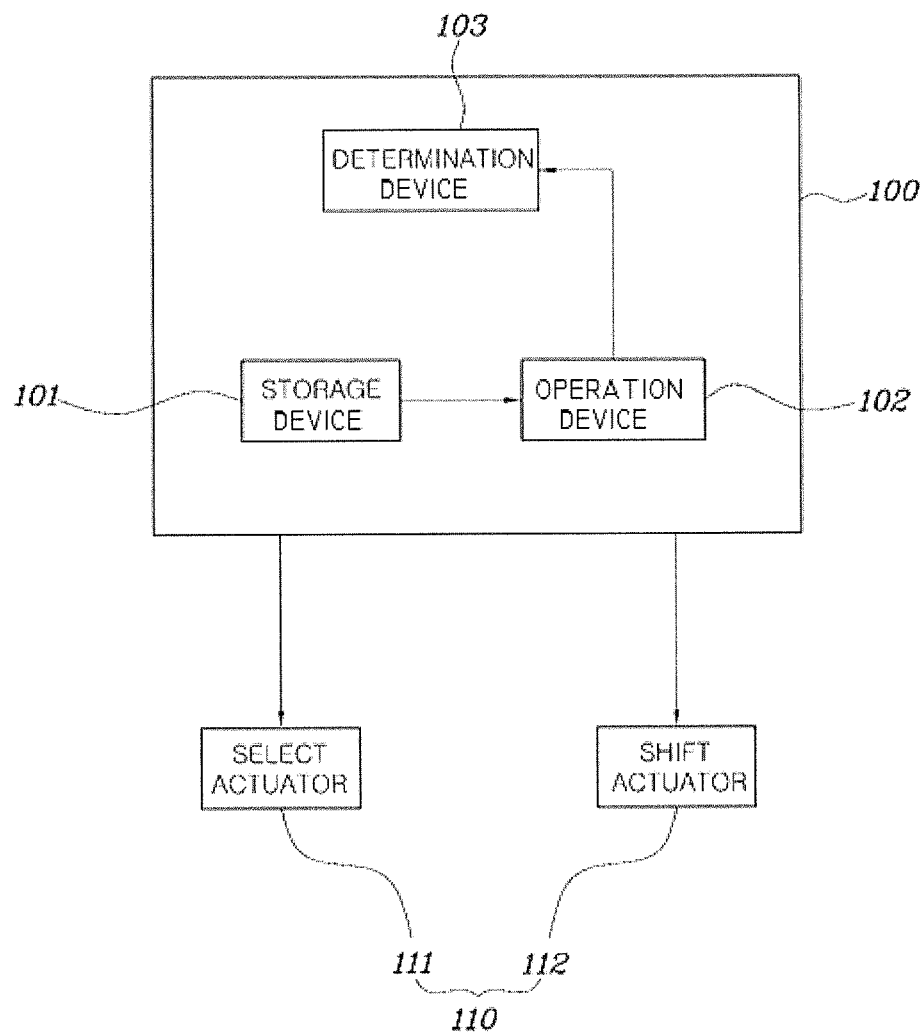
FIG. 5 is a block diagram illustrating a configuration of a controller of the actuator of the transmission according to an exemplary embodiment of the present invention.

FIG. 5 is a block diagram illustrating a configuration of a controller 100 of the actuator 110 of the transmission which may perform various embodiments of the present invention as described above. The controller 100 may include a storage device 101 configured to store damage indexes which are separately set for each size of the applied current to the actuator 110 of the transmission, an operation device 102 configured to acquire and accumulate the damage indexes from the storage device depending on the magnitude of the current applied to the actuator of the transmission, and a determination device 103 configured to determine the actuator 110 of the transmission as a failure when the accumulated damage index exceeds the predetermined reference index.

Further, the storage device 101, the operation device 102, and the determination device 103 may be each configured to be physically separated or integrated in one body.

Meanwhile, the actuator 110 of the transmission described in various embodiments of the present invention is used as a term including a select actuator 111 which performs the selecting operation and a shift actuator 112 which performs a shifting operation.

According to various embodiments of the present invention, it is possible to prevent the durability of the actuator of the transmission from reducing or the actuator of the transmission from being damaged and the performance of the transmission from deteriorating, by appropriately diagnosing and determining whether the excessive loads such as stuck or jam are applied to the actuator of the transmission.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A diagnostic method for shifting an actuator of a transmission, comprising:
   accumulating, by a controller, a damage index for an applied current when a current is applied to the actuator of the transmission; and
   determining, by the controller, whether accumulated damage index exceeds a predetermined reference index and when the accumulated damage index is determined to exceed the predetermined reference index, determining the actuator as having a failure,
   wherein the damage indexes are defined as a value for a predetermined unit time depending on a continuous application allowable time for each corresponding current which is a time at which a motor for the actuator of the transmission endures operating without damage when a current is continuously applied, and
   wherein the controller cuts off the current being applied to the actuator when the actuator is determined to be having the failure.

2. The diagnostic method of claim 1, wherein damage indexes are separately set for each magnitude in the applied current and the controller determines the damage indexes corresponding to a magnitude of currently applied current and accumulates determined damage indexes for each operation cycle of the controller.

3. The diagnostic method of claim 2, wherein when the damage indexes are accumulated for the continuous application allowable time for each corresponding current, the damage indexes are each set to be 100, and
   in the determining of the failure, when the predetermined reference index is set to be 100 and thus the accumulated damage index is 100 which is the reference index, the actuator is determined as having the failure.

4. A controller for an actuator of a transmission, comprising:
   a storage device storing damage indexes which are separately set for each magnitude of an applied current to the actuator of the transmission;
   an operation device acquiring and accumulating the damage indexes from the storage device depending on a magnitude of the current applied to the actuator of the transmission; and
   a determination device determining the actuator of the transmission as having a failure when the accumulated damage index exceeds a predetermined reference index,
   wherein the actuator comprises:
      a select actuator performing a selecting operation; and
      a shift actuator performing a shifting operation, and
   wherein the damage indexes are defined as a value for a predetermined unit time depending on a continuous application allowable time for each corresponding current which is a time at which a motor for the actuator of the transmission endures operating without damage when a current is continuously applied.

* * * * *